United States Patent
Molliere

(10) Patent No.: US 6,811,180 B1
(45) Date of Patent: Nov. 2, 2004

(54) COMBINATION WORK AND RECREATION CART

(76) Inventor: Daryl W. Molliere, 650 Bells Ferry Rd., Comer, GA (US) 30629

( * ) Notice: Subject to any disclaimer, the term of this patent is extended or adjusted under 35 U.S.C. 154(b) by 0 days.

(21) Appl. No.: 10/366,147

(22) Filed: Feb. 13, 2003

Related U.S. Application Data
(60) Provisional application No. 60/357,397, filed on Feb. 15, 2002.

(51) Int. Cl.$^7$ .............................. B62B 1/00; B62B 1/04; E06C 7/16; E04G 1/00; B60R 15/00
(52) U.S. Cl. ...................... 280/652; 280/30; 280/648; 280/659; 182/116; 182/129; 296/174
(58) Field of Search .................. 280/652, 30, 639, 280/640, 42, 648, 651, 659; 182/20, 116, 106, 129, 187; 296/174

(56) References Cited

U.S. PATENT DOCUMENTS

| | | | |
|---|---|---|---|
| 3,025,985 A | * 3/1962 | Crawford | 414/537 |
| 3,282,375 A | 11/1966 | Ray | |
| 3,352,379 A | 11/1967 | Riggs | |
| 3,822,813 A | 7/1974 | Carter | |
| 4,009,762 A | * 3/1977 | Bjerkgard | 182/20 |
| 4,045,040 A | 8/1977 | Fails | |
| 4,253,546 A | * 3/1981 | Uchida | 182/20 |
| 5,064,020 A | * 11/1991 | Eagleson | 182/20 |
| 5,195,611 A | 3/1993 | Untz | |
| D335,188 S | 4/1993 | Rosser | |
| 5,282,520 A | 2/1994 | Walker | |
| 5,295,556 A | 3/1994 | Mullin | |
| 5,314,042 A | * 5/1994 | Adams | 182/187 |
| 5,433,291 A | 7/1995 | Shoestock, Sr. | |
| 5,482,137 A | 1/1996 | McNeill | |
| D367,122 S | 2/1996 | Foster | |
| 5,492,196 A | 2/1996 | Michno | |
| D372,986 S | 8/1996 | Oerther | |
| 5,566,780 A | 10/1996 | Bambrough | |
| 5,590,738 A | 1/1997 | Hunt et al. | |
| 5,624,008 A | 4/1997 | Beardslee, Jr. | |
| 5,839,538 A | 11/1998 | Magyar | |
| 5,853,189 A | * 12/1998 | Swartzlander | 280/652 |
| 5,887,676 A | 3/1999 | Harbin | |
| 5,903,997 A | 5/1999 | Jacob | |
| 5,967,544 A | * 10/1999 | Kanta | 280/652 |
| 6,053,278 A | 4/2000 | Myers | |
| 6,186,271 B1 | 2/2001 | Borries et al. | |
| 6,283,496 B1 | 9/2001 | Dickmann | |
| 6,516,918 B2 | * 2/2003 | Hess | 182/20 |
| 6,557,867 B1 | * 5/2003 | Angstadt | 280/30 |

FOREIGN PATENT DOCUMENTS

GB 2129860 A * 5/1984 ................ 280/652

* cited by examiner

Primary Examiner—Christopher P. Ellis
Assistant Examiner—Gerald B. Klebe
(74) Attorney, Agent, or Firm—Hinkle & O'Bradovich, LLC

(57) ABSTRACT

A combination work and recreation cart. The cart generally includes a frame having a handle, wheels, rungs and retainer tabs. Extension rails can be connected to the frame to create cot, lounger and hunting stand. The cart also includes a tray that can be used to store the cart's components and to be made into a table. The cart further includes a vehicle carry bar that allows the cart and its components to be attached to a typical vehicle trailer hitch.

17 Claims, 12 Drawing Sheets

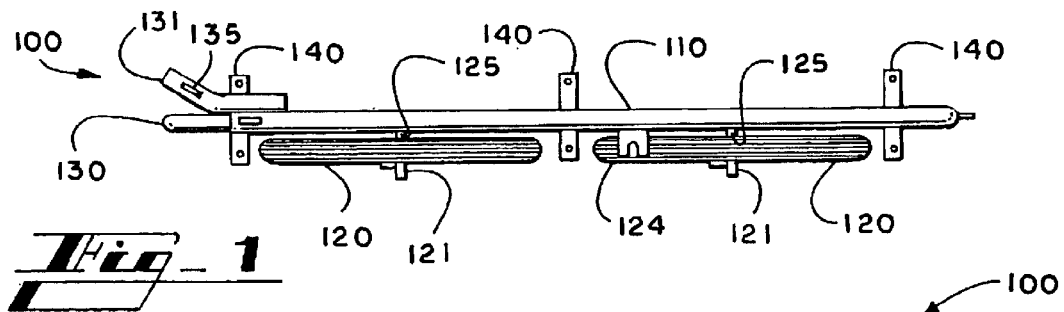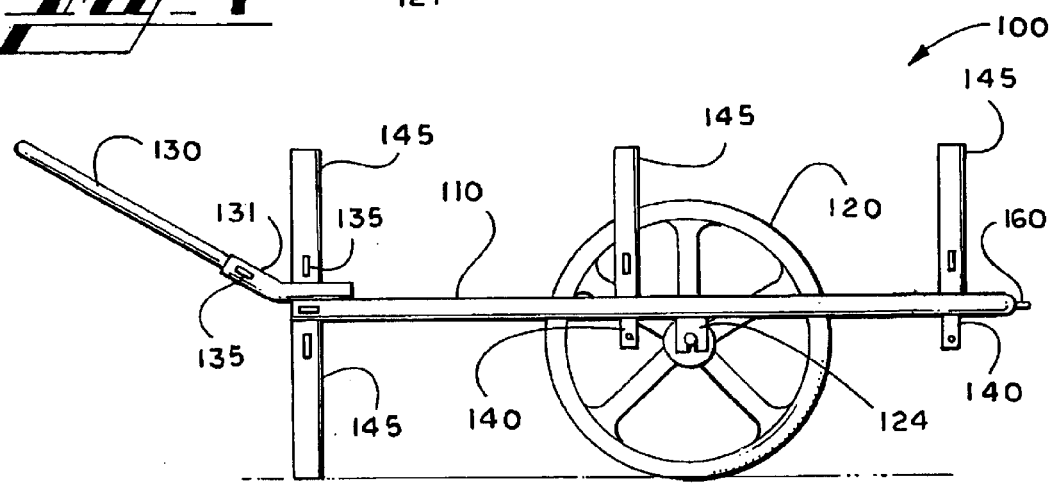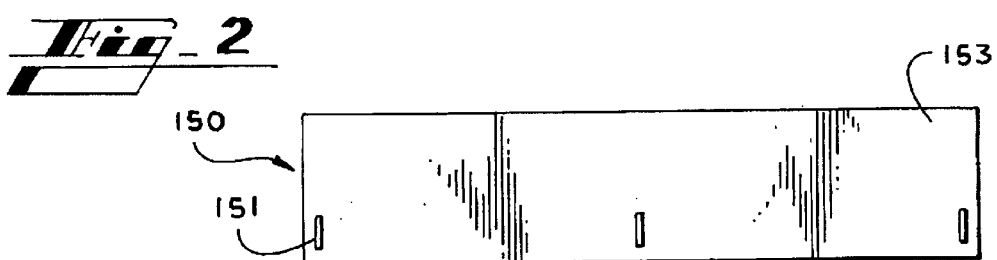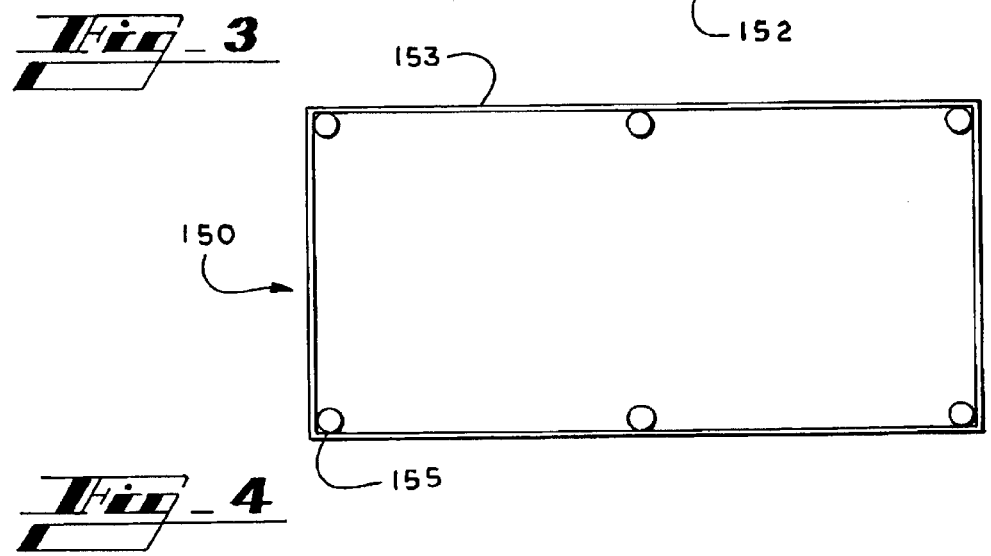

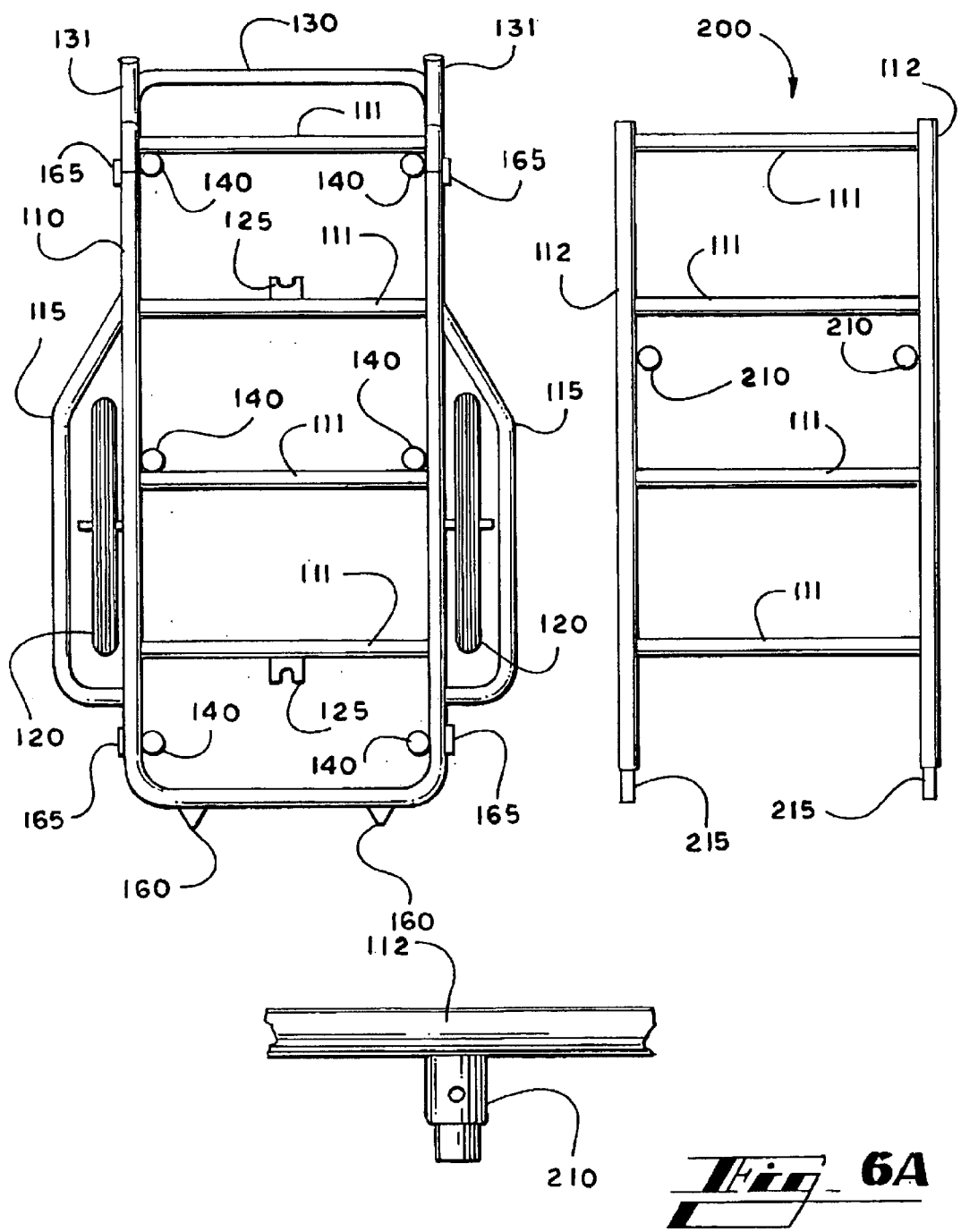

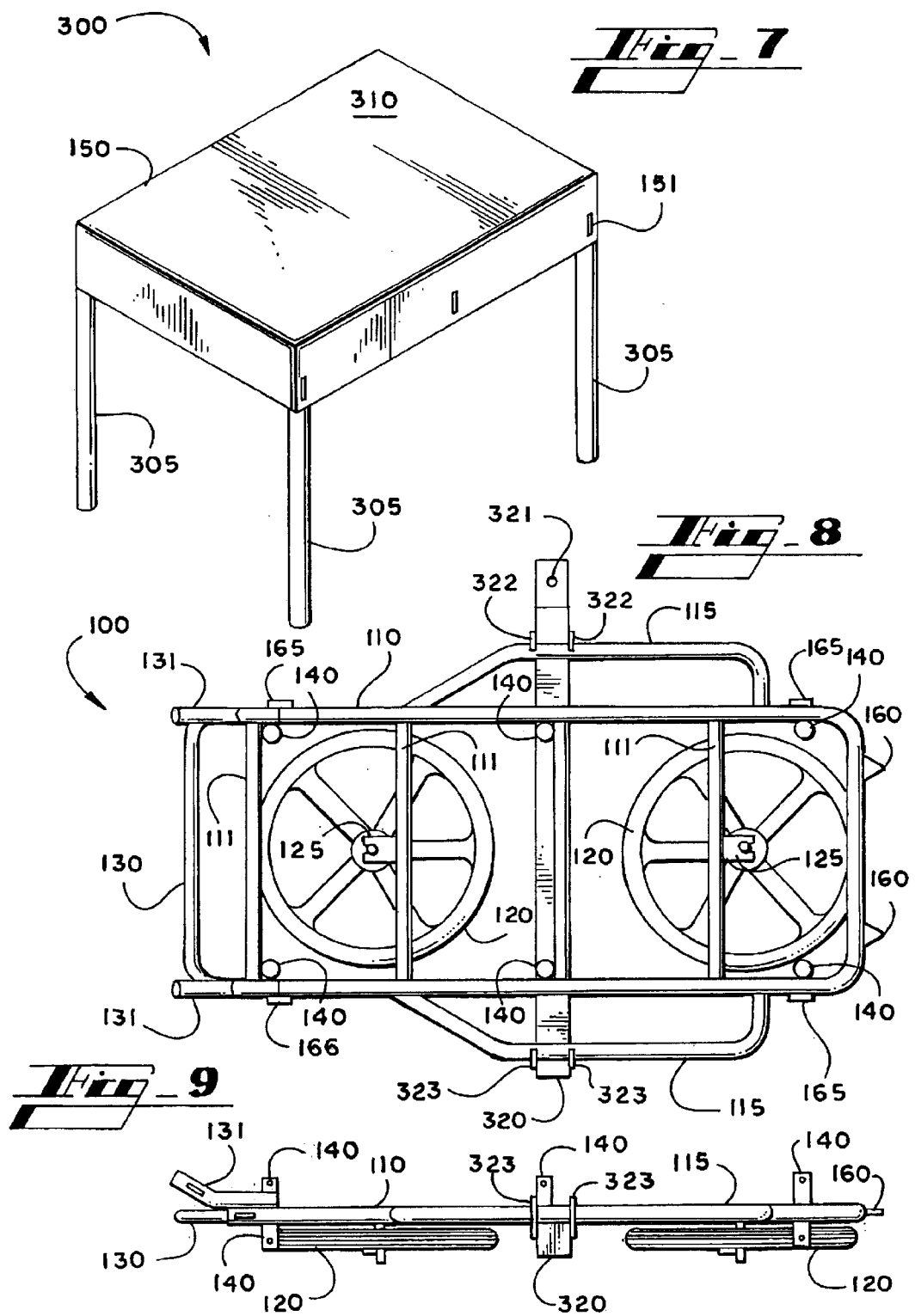

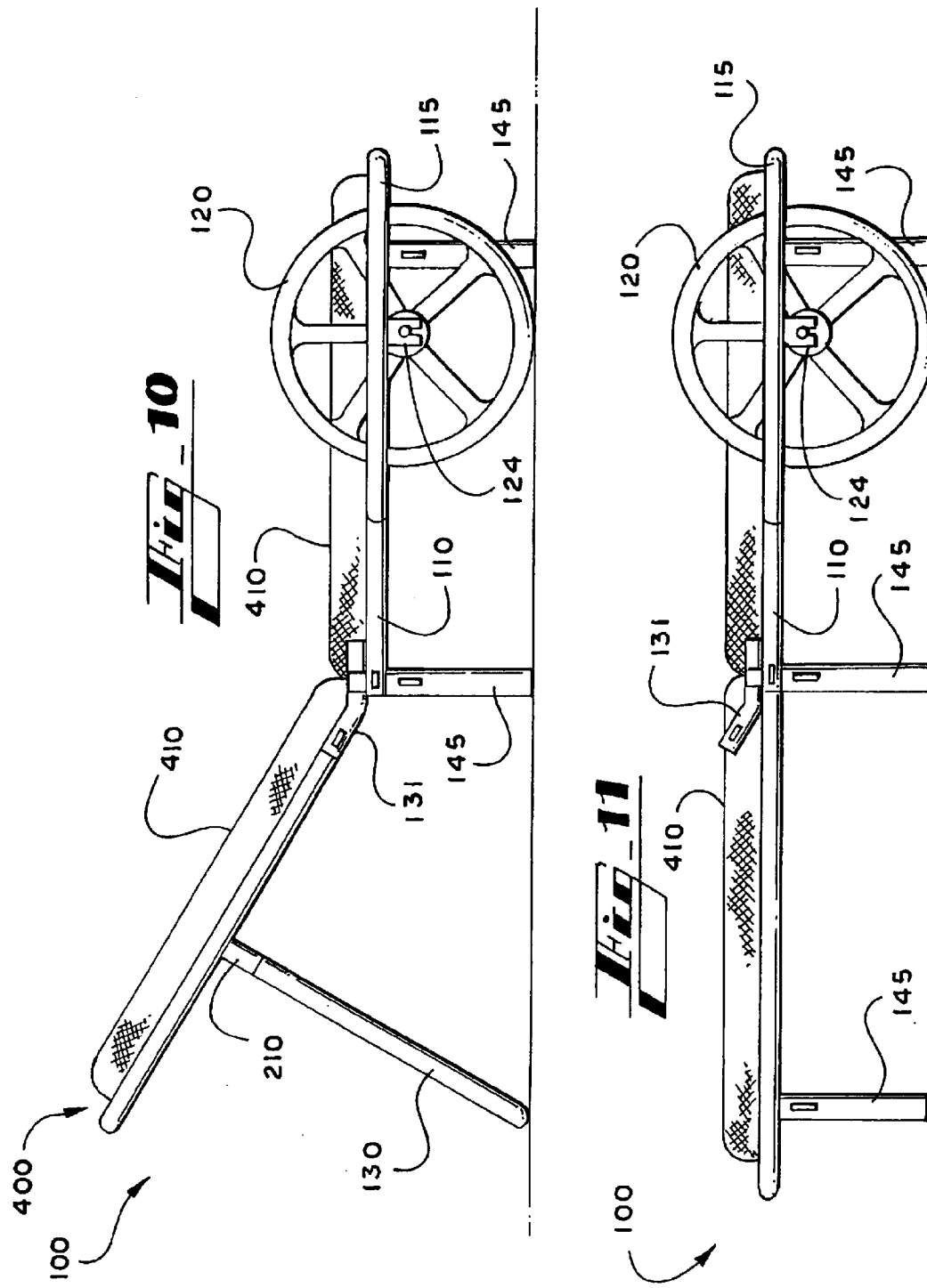

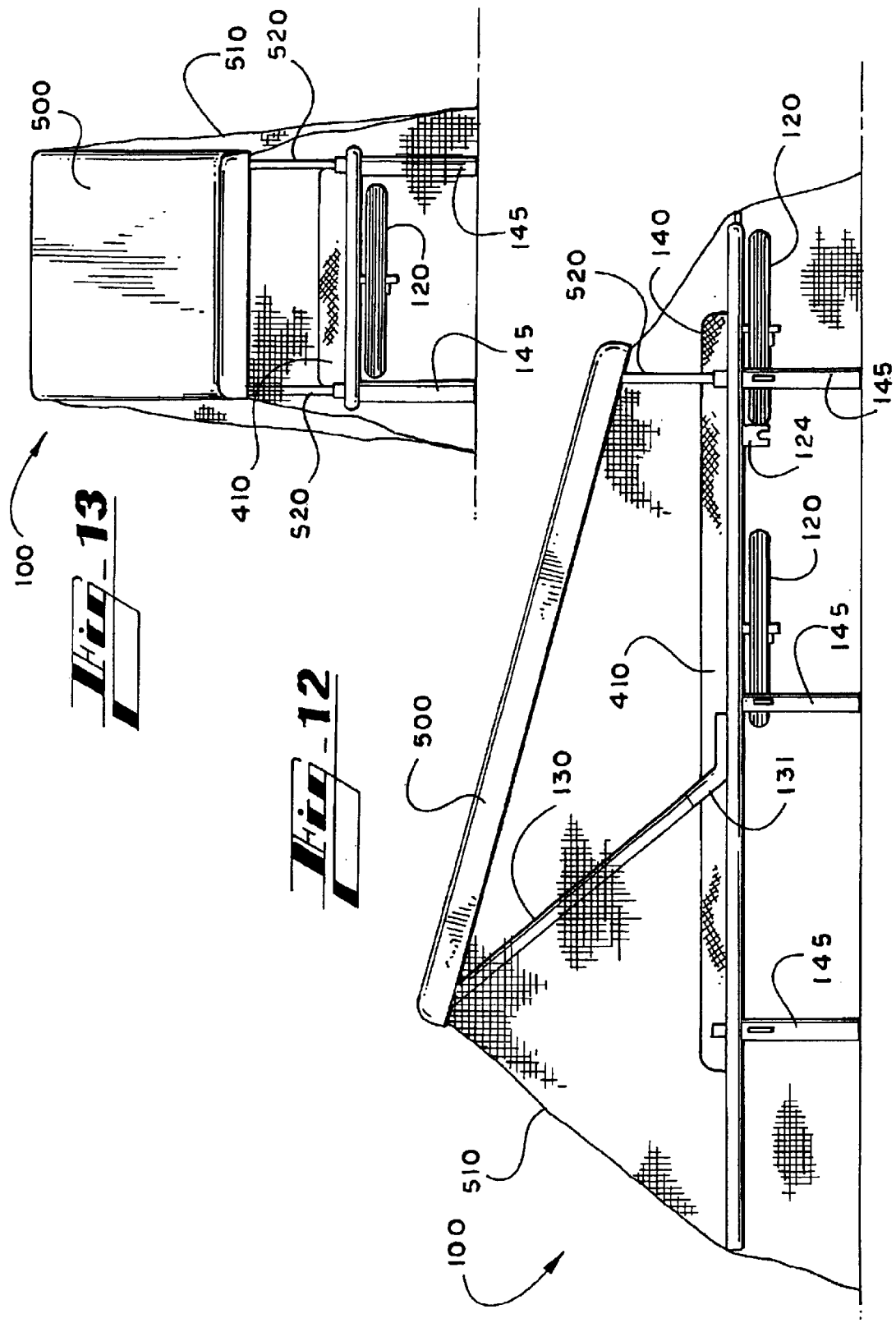

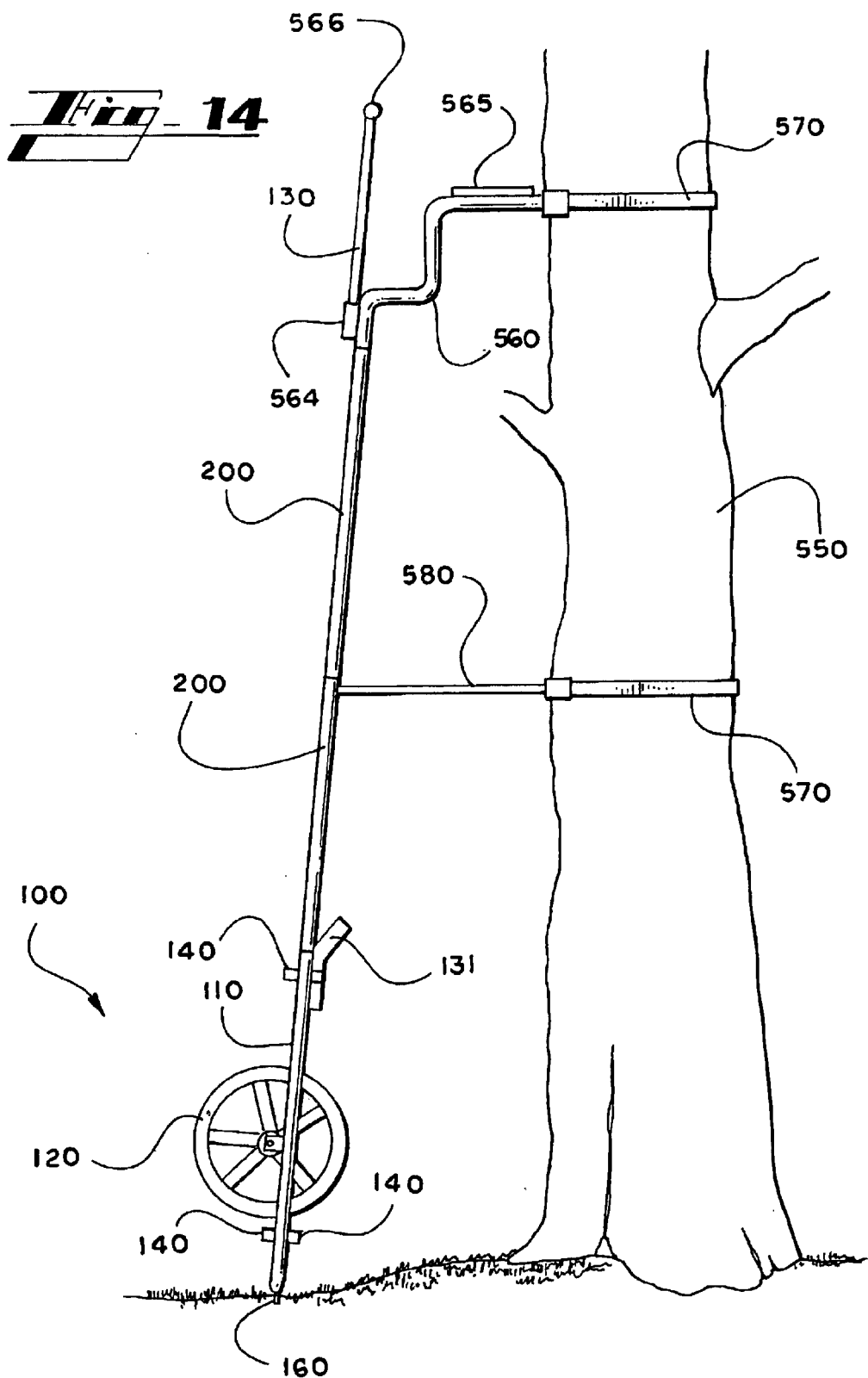

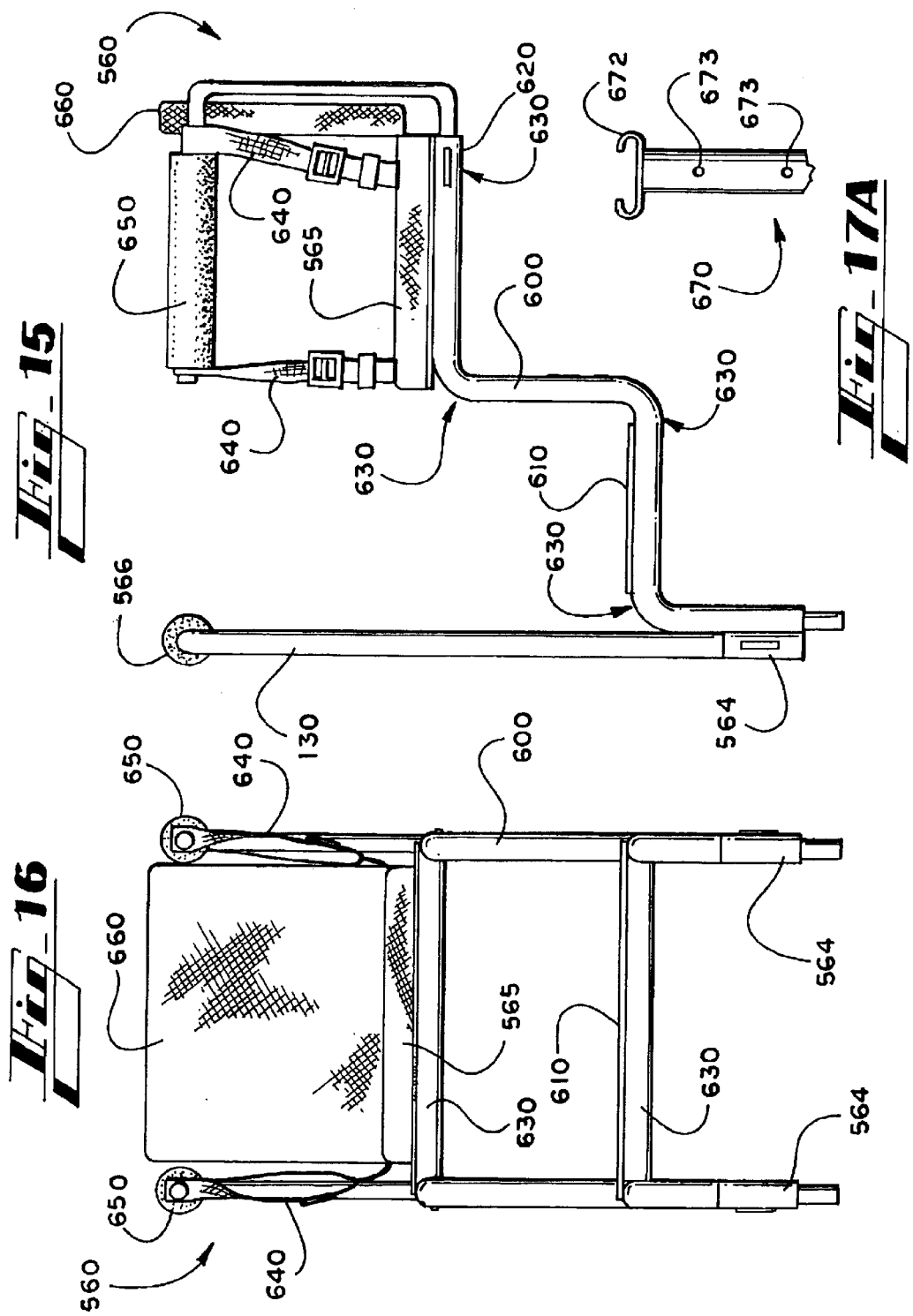

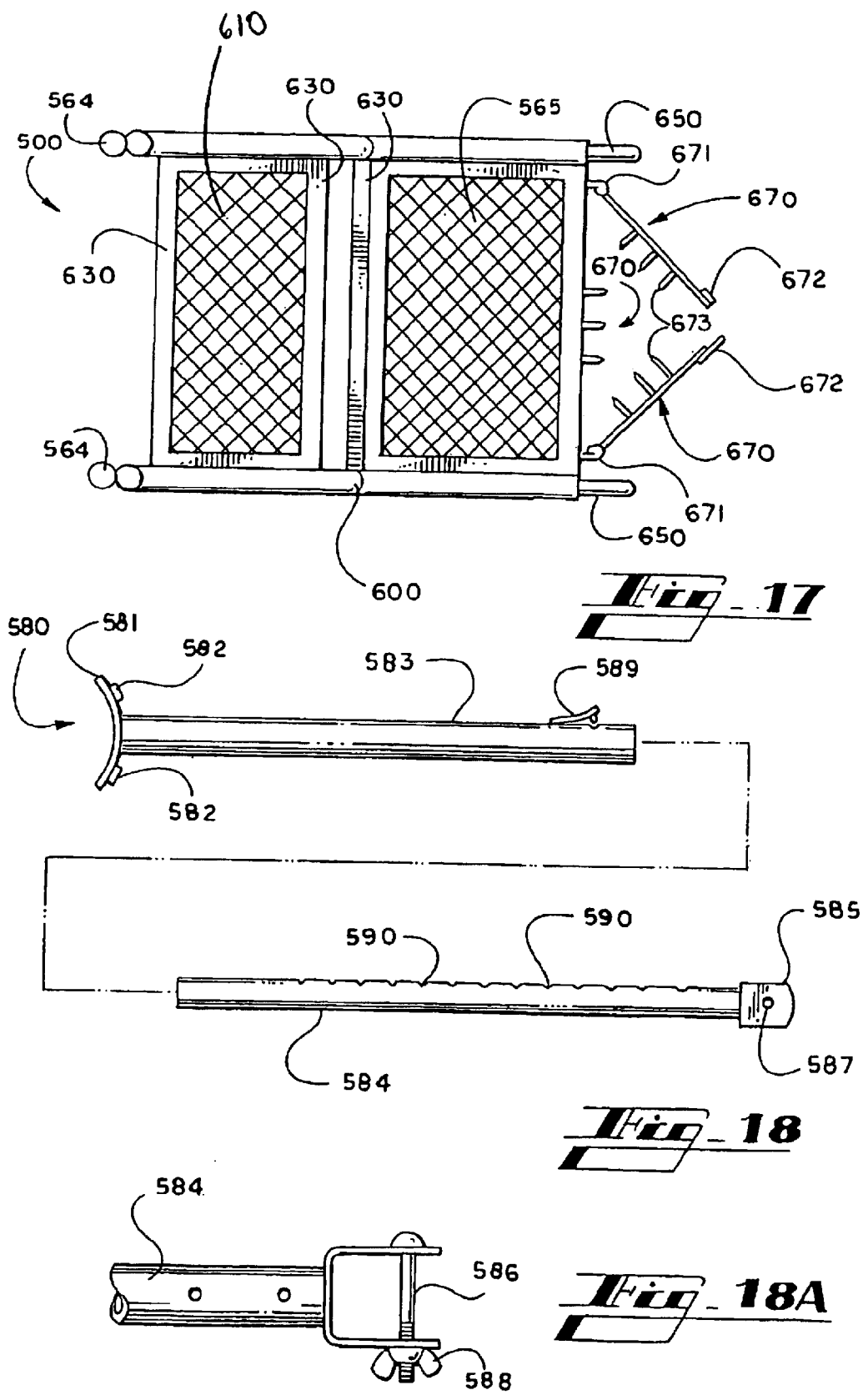

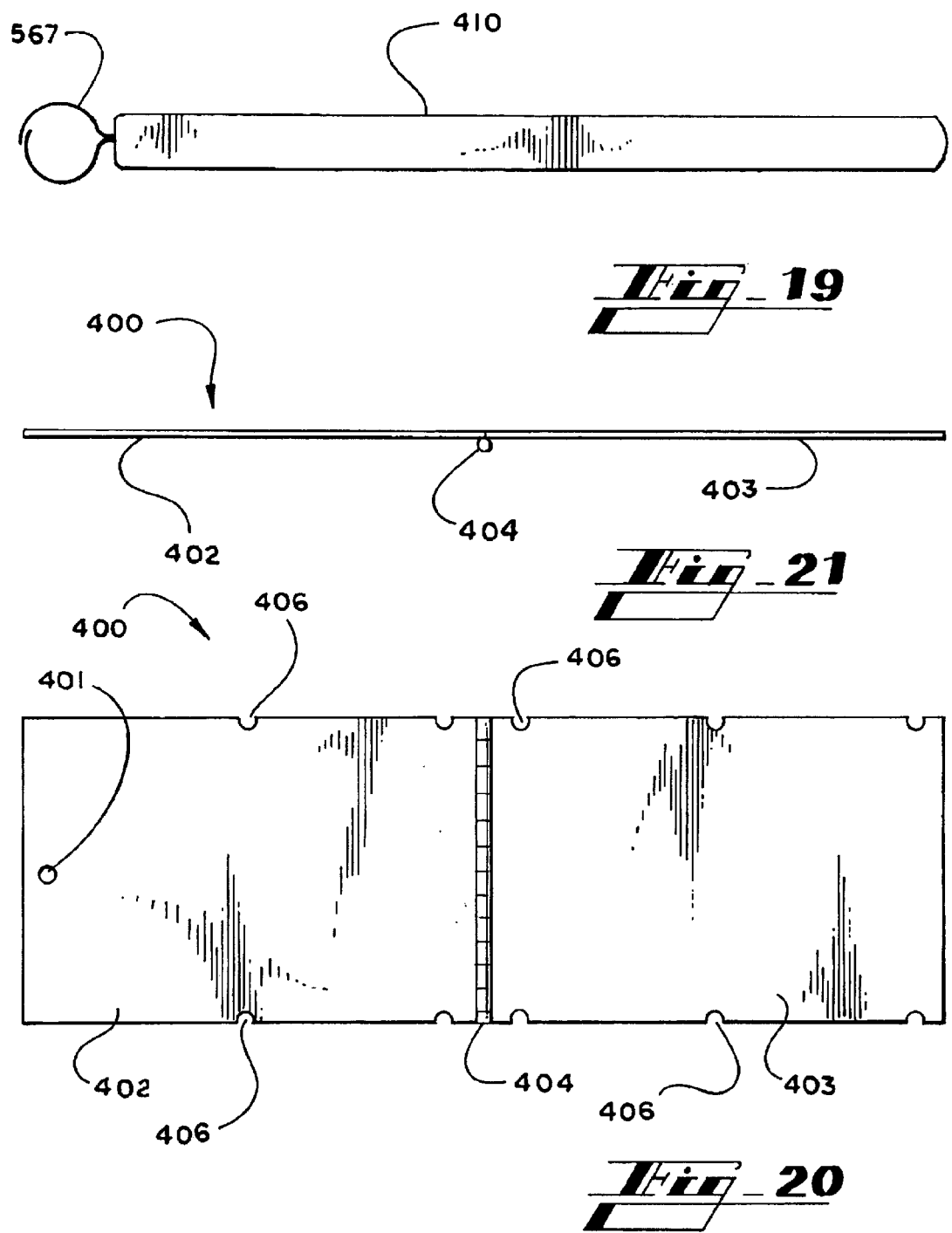

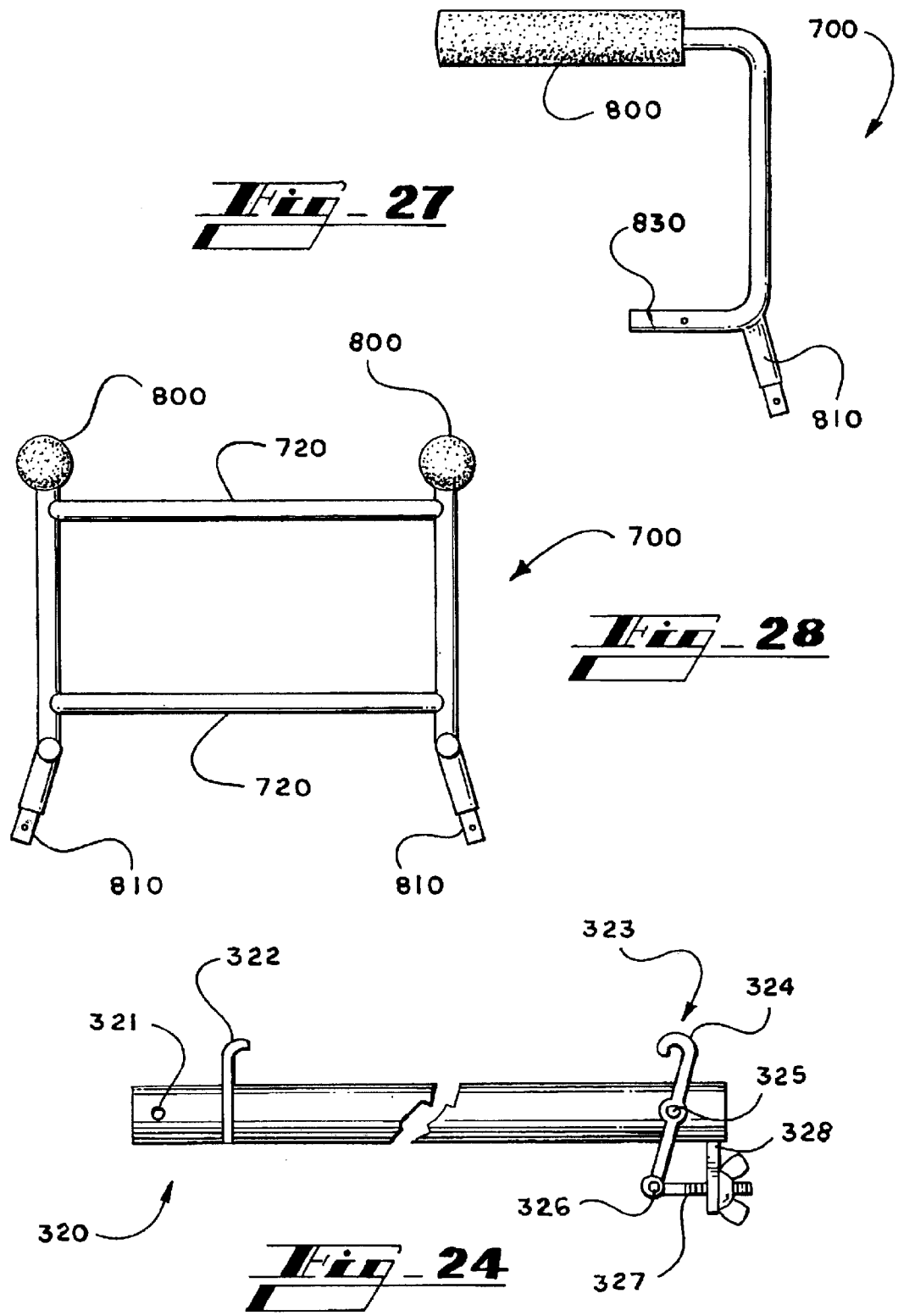

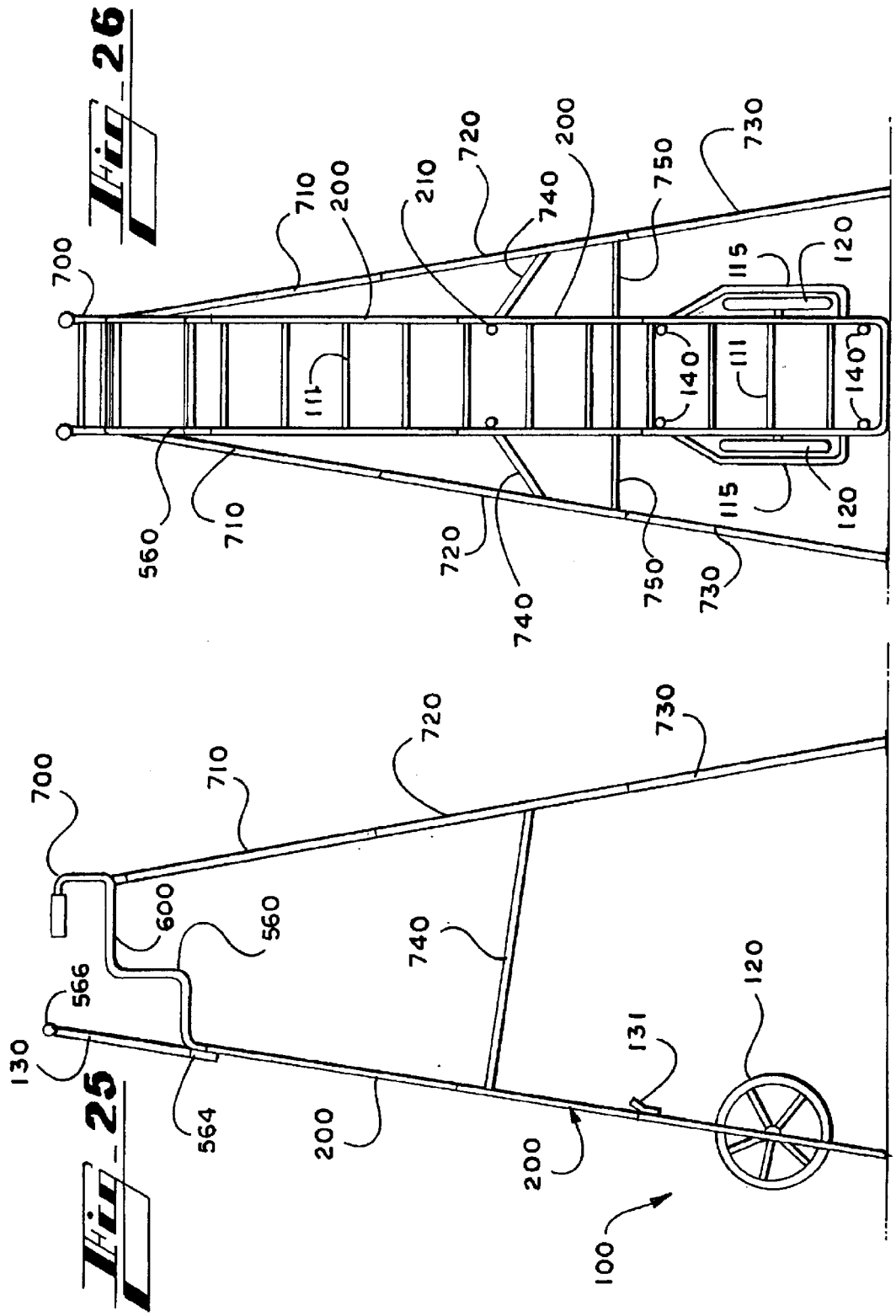

COMBINATION WORK AND RECREATION CART

Priority based on Provisional Patent Application Ser. No. 60/357,397, filed Feb. 15, 2002, and entitled "Combination Work and Recreation Cart" is claimed.

BACKGROUND OF THE INVENTION

I. Field of the Invention

The present invention relates generally to the field of work and recreational equipment and more particularly to a combination cart having multiple work and recreational uses.

II. Description of the Related Art

For those people who use work and recreational equipment, particularly those people who enjoy being outdoors, owning various prices of equipment can be cumbersome. For example, hunters, who require both recreational and work equipment, may have to bring a hunting stand, cot, camping table, equipment cart and possible a trailer to haul the equipment on a typical overnight hunting trip. These various pieces of equipment can take up much space and be cumbersome on an otherwise enjoyable trip.

SUMMARY OF THE INVENTION

In general, the invention features a combination work and recreation cart having multiple uses and functions.

In general, in one aspect the invention features a utility and recreation cart, including a frame having two elongated and substantially parallel side tubes and a plurality of rungs substantially spaced along the frame and substantially perpendicular to the side tubes, handle mounting brackets connected to the side tubes at an end of the frame, wheels connected to the frame, storage tabs connected to the rungs, wheel brackets connected to the frame, a plurality of retainer tabs connected substantially perpendicular to the frame and a handle connected to the frame.

In one implementation, the cart includes a plurality of poles connected to the retainer tabs.

In another implementation, the cart includes a tray connected to the frame, the tray having a plurality of tray tubes.

In another implementation, the wheels are connected to the wheel brackets.

In another implementation, the wheels are connected to the storage tabs.

In another implementation, the cart includes an extension rail connected to the frame.

In another implementation, the cart includes wheel shields connected to the frame and proximate the wheels.

In another implementation, the handle is connected to the handle mounting bracket.

In still another implementation, the cart includes a vehicle carry bar having a first end and a second end and connected to the frame.

In yet another implementation, the vehicle carry bar further comprises a fixed cart retaining bracket connected proximate the first end, and a pivot cart retaining bracket connected the second end.

In another aspect, the invention features a utility and recreation cart, including a frame having a plurality of rungs and connected to wheels, means to form the cart into a cot connected to the cart, means to form the cart into a lounger connected to the cart, means to form the cart into a hunting stand connected to the cart and means to form the cart into a table connected to the cart.

In one implementation, the means to form the cart into a cot and the means to form the cart into a lounger includes an extension rail having rungs and connected to the frame, a cushion plate in mechanical contact with the rungs of the frame and the extension rail and a cushion in mechanical contact with the cushion plate.

In another implementation, the means to form the cart into a hunting stand comprises at least one extension rail connected to the frame and a seat portion connected to the at least one extension rail.

In another implementation, the means to form a table comprises a cart tray having a plurality of tray tubes and table legs connected to the tray tubes.

In another aspect, the invention features a cart kit, including a frame having a plurality of rungs, wheels connected to the frame, a tray adapted to be connected to the frame, a first extension bar adapted to be connected to the frame and at least one additional extension bar adapted to be connected optionally to the frame and optionally to the first extension bar.

In one implementation, the kit includes a hunting attachment set including a seat portion.

In another implementation, the kit includes a tripod attachment adapted to be connected to the seat.

In another implementation, the kit includes ratchet straps adapted to connect the hunting attachment set to an object.

In another implementation, the kit includes a telescoping support bar adapted to secure the hunting attachment to the object.

In another implementation, the kit includes a cot and lounger attachment set having a cushion, canopy and net.

In another implementation, the tray further includes poles.

The cart is capable of multiple uses which includes but is not limited to a utility cart. The cart includes quick detachable wheels that remove without the use of tools and that store on storage tabs on the cart in a parallel position close to the cart frame. The handle of the cart stores into the frame of the cart protruding slightly from the frame. This compact storage can be placed into most car trunks, sports utility vehicles in the bed of trucks and also as a cargo rack on the receiver hitch of a vehicle leaving room to place other cargo with it.

The cart can be used stand alone and include rubber tires and an extended handle that can be positioned to make the frame of the cart horizontal to the ground with a low profile making it easy to load and unload items. The cart can be configured with legs that easily attach and detach from the cart. The cart can stand alone in a horizontal position making it a good tool for hauling around square bales of hay and other items. When used with retainer poles, typically the same as the legs but placed on top tabs, the cart can be used to haul items which could typically fall off the cart without them, such as logs firewood camp gear and the like.

When used with the tray, which is a container that secures and removes easily to the car and has much surface area, items such as dirt manure straw, wood chips and the like can be maneuvered easily. With the tray removed, and the legs inserted into the retainer holes of the tray, it can be used as a flat table. When the tray is turned over and the legs reinserted from the other side, it can be converted into a tray table that can hold items thereby keeping them from falling off the table.

With the use of an extension rail, the lounger/cot cushion and cushion plate, legs and the handle, the cart can be converted into a lounger. With the use of the extension rail, the lounger/cot cushion and the legs, the cart can be converted to a cot. In addition, a canopy can be added to the cot. A mosquito net and rain fly store in a pouch around the underside edges of the canopy can be added to the cot. The mosquito net and rain fly store in a pouch around the underside edges of the canopy is typically secured with a fastener. The mosquito net can be let down without the rain fly to keep bugs out and still let the air through. Alternatively the rain fly can be let down to keep out undesirable weather conditions.

With the use of some of the pre-mentioned features, the cart can be used for a recreational lounger to carry ice chests, food a grill and the like. The cart can also be used for hunting. It can be used as a ladder stand when used with the extension rails, a stabilizer bar and a seat attached to a stationary object. It can also be used as a stand alone tripod stand when used with the pre-mentioned pieces in conjunction with a tripod attachment, legs and support braces. The cart includes tabs on the end to keep the stand from kicking away from the stationary object when used as a ladder stand. The seat is then equipped with several attachments to make it comfortable for hunting photographing and watching wildlife. Cushioned armrests with a cushioned seat and backrest makes it comfortable for setting in the seat for extended periods of time. The armrests are inserted into the frame rail of the seat from the back. The seat frame has spring retainers on it to keep the armrest in place. A padded gun rest can be made from the handle and inserted into the holes on the front of the seat. This rest helps sturdy the gun for use. A harness secured to the stationary object can also be used by the occupant.

A seat portion can be used as a stand-alone seat and table when attached to the stationary object and using a ratchet strap to hold it in place. The table can be used to eat or work on weapons or as a shooting bench. The ratchet straps are also used to attach to the stationary object. In addition, the cart can be used to transport the quarry from the hunt. The low profile of the cart aids in loading the quarry onto the cart. All other parts of the ladder stand can be securely placed on the cart with the quarry and strapped down for transport. Once the user reaches his vehicle the wheels can be removed and stored on their storage tabs. The cart can then be placed over a vehicle receiver carry bar that is placed in the hitch's receiver. The cart is secured ti the bar with a wing nut. The quarry can be transported without having to load it into the sports utility vehicle, car truck or bed of a truck.

The car when used with the vehicle carry bar can be used as a cargo rack and can carry different items with the use of the attachments.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates an embodiment of a combination cart in a stored position;

FIG. 2 illustrates a side view of an embodiment of a combination cart;

FIG. 3 illustrates a side view of an embodiment of a combination cart tray;

FIG. 4 illustrates a top view of an embodiment of a combination cart tray;

FIG. 5 illustrates a top view of an embodiment of a frame of a combination cart;

FIG. 6 illustrates an embodiment of an extension rail;

FIG. 6A illustrates an embodiment of retainer tabs;

FIG. 7 illustrates an embodiment of a table;

FIG. 8 illustrates a top view of an embodiment of a stored combination cart;

FIG. 9 illustrates a side view of an embodiment of a stored combination cart;

FIG. 10 illustrates a side view of an embodiment combination cart is a lounge configuration;

FIG. 11 illustrates a side view of an embodiment of a combination cart in a cot configuration;

FIG. 12 illustrates a side view of a combination cart in a cot, canopy and mosquito net configuration;

FIG. 13 illustrates a front view of the combination cart in a cot, canopy and mosquito net configuration of FIG. 12;

FIG. 14 illustrates a side view of a combination cart in a hunting stand configuration;

FIG. 15 illustrates a side view of an embodiment of a seat for a combination car configuration of FIG. 14;

FIG. 16 illustrates a front view of the seat of FIG. 15;

FIG. 17 illustrates a top view of the seat of FIGS. 15–16;

FIG. 17A illustrates an embodiment of a grip bar;

FIG. 18 illustrates an embodiment of a telescoping bar;

FIG. 18A illustrates a close up view of a portion of the telescoping bar of FIG. 18;

FIG. 19 illustrates an embodiment of a seat cushion;

FIG. 20 illustrates a top view of an embodiment of a cushion plate;

FIG. 21 illustrates a side view of an embodiment of a cushion plate;

FIG. 24 illustrates an embodiment of a carry bar;

FIG. 25 illustrates a side view of a combination cart in self-supporting hunting stand configuration;

FIG. 26 illustrates a front view of a combination cart in a self-supporting hunting stand configuration;

FIG. 27 illustrates a side view of an embodiment of a tripod attachment; and

FIG. 28 illustrates a front view of an embodiment of a tripod attachment.

DETAILED DESCRIPTION

Figure 22:
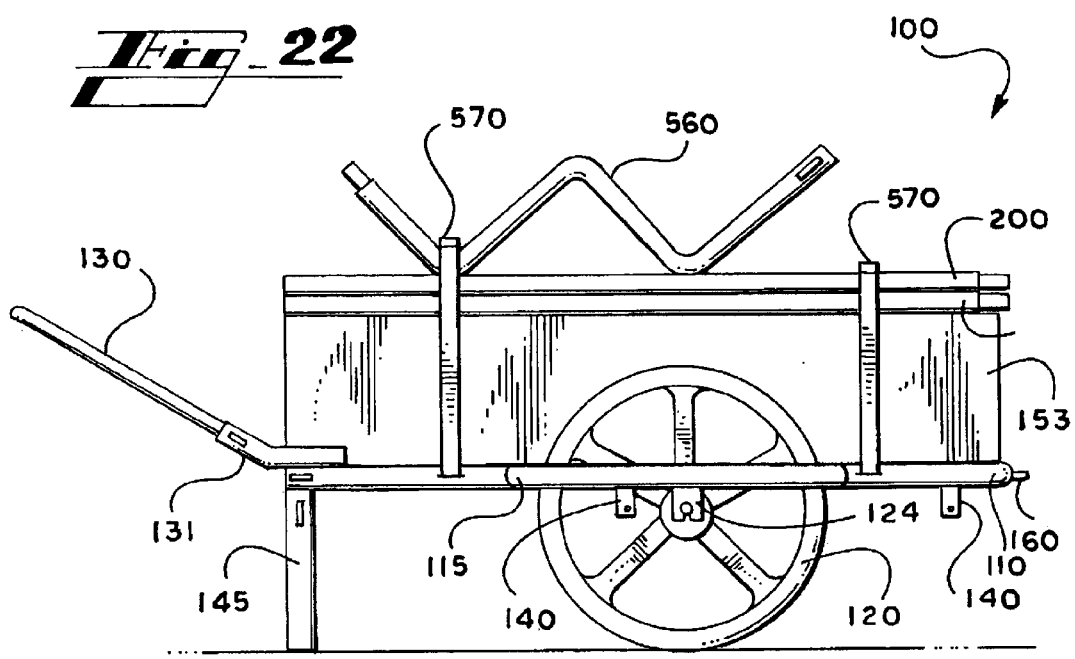
FIG. 22 illustrates a side view of a combination cart in a tow configuration.

Referring to the drawings wherein like reference numerals designate corresponding parts throughout the several figures, reference is made first to FIG. 1 that illustrates an embodiment of a combination cart 100 in a stored position. A tubular frame 110 is used to store the basic parts, which are used in turn to attach multiple other attachments for various purposes. Wheels 120 are typically tubular having rubber tires with a release nut 121 that allows mounting and switching the tires to and from wheel brackets 124 for storage on storage tabs 125. A handle 130 is attached to the frame 110 and is typically stored within the frame 10. In one embodiment, the tubular frame 110 and is typically hollow so that the handle 130 can fit within a portion of the hollow tubular frame 110. The cart 100 further includes a handle mounting bracket 131 connected to the frame 110. The handle mounting bracket 131 is adapted to receive a portion of the handle 130 and lock the handle in a fixed position connected to the frame 110 at an angle that is convenient for a user to engage the handle 130. When in the stored position a locking device 135 holds the handle 130 in a locked position. In one implementation, the locking device can be a spring retainer along with a spring button. In general, the retainer device 135 can be a spring loaded button that can be pressed as a tube or other accessory passes over it. Then the button can spring into place when the accessory is secured into place. Typically the accessory can include a hole into which the button can spring. The cart 100 further includes a number of retainer tabs 140 that are connected to the frame 110. The retainer tabs 140 have a variety of uses discussed further in the description below.

FIG. 2 illustrates a side view of an embodiment of a combination cart 100. Several leg/retainer poles 145 installed on the retainer tabs 140. The poles 145 can include a locking mechanism similar to the retainer device 135 so that the poles 145 can be secured on the retainer tabs 140. Several of the poles 145 can be placed on the retainer tabs 140 on the top of the cart 100 for various used as described below. Two or more of the poles 145 can be placed on the retainer tabs 140 on the bottom of the cart 100 to be used as resting poles for the cart 100. The handle 130 can be inserted into the handle mounting bracket 131 and locked into place with a locking mechanism. The tires 120 are typically slid into place on the wheel brackets 124. The wheels 120 can be tightened into place onto the wheel brackets 124 with a nut, quick release nut or other suitable device, thereby locking the wheels 120 into place.

FIG. 3 illustrates a side view of an embodiment of a combination cart tray 150. The tray 150 is typically constructed of metal sheeting and can be welded at any of its joints. In other embodiments, the tray 150 can be plastic, fiberglass or other suitable materials. The tray 150 can include a locking mechanism 151 that allows the tray 150 to be placed into position and locked into one or more of the retainer tabs 140 on the frame 110. In general, the tray includes a bottom portion 152 and walls 153 so that there is a large space for placement of items in the tray 150.

FIG. 4 illustrates a top view of an embodiment of a combination cart tray 150. Tray tubes 155 are used to position the tray 150 onto the frame 110. In one embodiment, the tray tubes 155 are adapted to fit directly onto the retainer tabs 150 and lock into place with a suitable locking mechanism. In another embodiment, the tray tubes can fit directly onto the tubes 145 that have been placed on the retainer tabs 140. In general, the tray tubes 155 are placed along the outer edges of the tray 150 to generally correspond with the retainer tabs 140 on the frame 110.

FIG. 5 illustrates a top view of an embodiment of the combination cart 100. This view illustrates that the frame 110 includes several rungs 111 connected to the frame 110. The storage tabs 125 are shown connected to two of the rungs 111 and are spaced far enough apart so that when the wheels 120 are connected to the storage tabs 125 the wheels 120 are not in contact. The frame 110 further includes wheel shields 115 that are typically additional tubes that provide protection for the wheels 120 from unintentional collisions. The frame further includes stand anchors 160 and tie down tabs 165 that are both used in conjunction with the cart 100 as a hunting stand as described in further detail below. As described above, the cart 100 includes several of the retainer tabs 140. The handle 130 is shown in a stored position within the frame 110.

FIG. 6 illustrates an embodiment of an extension rail 200. The extension rail 200 includes rungs 111 and can be various sizes. The rungs 111 are generally connected to side tubes 112. In one embodiment, the extension rail 200 can be used as a lounger/cot and therefore can include lounger/cot retainer tabs 210. The lounger/cot embodiments are discussed in the description below. The tabs 210 typically protrude out of the frame of the extension rail 200 at a distance and direction that allows the handle 130 to fit over it. The tabs 210 typically include a hole adapted to lock the legs/retainer poles 145. FIG. 6A illustrates an embodiment of retainer tabs 210. One end of the extension rail is tapered to allow it to fit into another tube of substantially the same size. In other embodiments, the ends 215 of the side tubes 112 can be connected to tubes of similar size such as the handle mounting brackets 131. In addition to the lounger/cot embodiments, the extension rails 200 can be used in other embodiments such as a hunting stand as discussed further in the description below.

FIG. 7 illustrates an embodiment of a table 300. The tray 150 as described in FIGS. 2 and 3 above can be configured with table legs 305 that can be inserted from either direction into the tray tubes 155 (see FIG. 3) and locked into place with the locking mechanism. The tray 150 is in an "upside down" orientation with the open end down, so that the flat lower surface 310 can be used as a table top or work surface.

FIG. 8 illustrates a top view of an embodiment of a stored combination cart 100 on a vehicle carry bar 320. The wheels 120 are stored on the wheel storage tabs 125. As described above, the wheels 120 can be secured to the tabs 125 with a nut and bolt or quick release nuts. The vehicle carry bar 320 is a type that can fit into a receiver hitch of a vehicle and this has a hole 321 through the bar 320 for the receiver's pin to fit. The carry bar 320 includes a fixed cart retaining bracket 322. The fixed cart retaining bracket 322 is typically made of steel that is adapted to fit snugly over the outside of the wheel shield 115. A pivoting cart retaining bracket 323 is located on the other end of the vehicle carry bar 320. The cart 100 is clamped onto the carry bar 320 by the fixed cart retaining bracket 322 and the pivoting cart retaining bracket 323. FIG. 9 illustrates a side view of an embodiment of a stored combination cart 100 on the vehicle carry bar 320.

FIG. 10 illustrates a side view of an embodiment combination cart 100 is a lounge configuration. For this configuration, the legs 145 are locked into the retainer tabs 140 on the frame 110 providing legs for the lounger. The extension rail 200 is slid into the handle mounting bracket 131. The extension rail 200 is inserted into the handle mounting bracket 131 creating an angle between the frame 110 and the extension rail 200. The handle 130 is slid onto the lounger/cot retaining tabs 210 on the extension rail 200 to provide a support for the extra weight on the extension rail 200 when a person lies on the cart 100 in the lounge configuration. A cushion plate 400 (discussed further below) includes a series of cut outs that fit over the retainer tabs 140 on the frame 110 to keep it in place. The cushion plate 400 lays on the rungs 111 of the frame 110 and the extension rail 200. A cushion 410 lies on top of the cushion plate 400. The cushion plate 400 provides a sturdy and flat surface for the cushion 410.

FIG. 11 illustrates a side view of an embodiment of a combination cart 100 in a cot configuration. The extension rail 200 is slid into the frame 110 (typically where the handle 130 is normally stored as described above) to make a substantially straight connection. The legs 145 are placed on the retainer tabs 140 and the lounger/cot tabs 210. The cushion plate 400 and the cushion 410 are placed on the frame 110 and the extension rail 200 and lie substantially flat. In another implementation, the frame 110 can be turned over prior to attaching the extension rail 200 so that the handle mounting bracket 131 angles downward so that it does not interfere with a person lying on the cot. In both the lounger and cot configurations, the wheels 120 are shown attached. In another implementation, the wheels 120 can either be stored on the storage tabs 125 or removed altogether.

FIG. 12 illustrates a side view of a combination cart in a cot, canopy and mosquito net configuration. A tent canopy 500 and mosquito net/weather shield 510 are added to the cot configuration. The tent canopy 500 is held up by the handle 130 that is placed in the handle mounting bracket 131 on the higher side of the cot and a tent pole 520 is placed on the retainer tabs 140 on the lower side of the cot. The mosquito net/weather shield 510 can be attached to the tent canopy 500 in a variety of ways including but not limited to hook and loop fasteners, snaps, buttons, hooks and the like. The wheels 120 are shown stored on the storage tabs 125. FIG. 13 illustrates a front view of the combination cart in a cot, canopy and mosquito net configuration of FIG. 12. In another implementation, instead of using the handle 130, several tent poles 520 can be placed on the retainer tabs so that the tent canopy 500 is placed higher up and substantially parallel to the frame 110 and extension rail 200.

FIG. 14 illustrates a side view of a combination cart 100 in a hunting stand configuration. The cart 100 and additional parts are configured in a vertical position as a ladder hunting/observation stand, attached to a stationary object such as a tree 550. The frame 110 is placed in a vertical position with one, two or more extension rails 200 and a seat portion 560 connected together. The frame 110 is held securely in the ground by stand anchors 160. The stand is held to the stationary object by the use of ratchet straps 570, a telescoping support bar 580 (discussed in further detail below) and by spikes 673 on the grip bar 670 on the seat portion 560. The spikes 673 and the grip bar 670 are not shown in detail in FIG. 14, but are described further below. The seat portion 560 can include a seat cushion 565 and a gun rest 566. The handle 130 can be connected to gun rest retainers 564. The gun rest 566 is connected to the handle 130.

FIG. 15 illustrates a side view of an embodiment of a seat portion 560 for a combination cart 100 configuration of FIG. 14. In several embodiments, the seat portion 560 can include several attachments. A seat frame 600 is formed with a place for the seat 565 and a footrest 610. The seat frame 600 further includes armrest retainers 620. The seat frame 600 further includes gun rest retainers 564 as described above. The seat 561 and footrest 610 can further include cross members 630 that are also connected to the seat frame 600. The footrest 610 and the seat 561 can typically be made of expanded metal and connected to the seat frame 600. The connections typically can be made by welding. The cushioned seat 565 includes seat straps 640 that are secured to a padded arm rest 650 and a cushioned back rest 660 that is typically hinged where it joins the cushioned seat 565. Seat strap tension brackets that are connected to the seat straps 640 allow the seat to be pulled tight enough to let the sides if the cushioned seat 565 to arch up on the sides to the curvature of the user. As discussed briefly above, the padded gun rest 566 slides onto the handle 130 and into the gun rest retainers 564. The padded arm rest 650 is typically tubular formed into a U-shape. The portion of the padded arm rest 650 that slides into the arm rest retainers 620 has a hole in which a connection mechanism keeps the padded arm rest 650 in place. FIG. 16 illustrates a front view of the seat of FIG. 15. FIG. 16 illustrates a front view of the back rest 660 as well as cross members 630. The handle 130 including the gun rest 566 has been removed for illustrative purposes.

FIG. 17 illustrates a top view of the seat of FIGS. 15–16. FIG. 17 illustrates the top view of the seat cushion 565, the foot rest 610, the gun rest retainers 564 and the frame 600. FIG. 17 further illustrates an additional accessory, grip bars 670 that can include grip bar hinges 671 that are typically attached to one of the cross members 630 connected to the seat 565. The grip bars 670 typically include a series of grip spikes 673 that are adapted to dig into a tree to provide further support for the hunting stand configuration described above. The grip bar hinges 671 allow the grip bars 670 to hinge with respect to the seat portion 560 to accommodate trees of varying size. Once the grip bars 670 are fixed into position, the ratchet straps 570 can be tied and fixed into the desired position. Strap retainers 672 located at the end of the grip bars 670 can connect to the ratchet straps 570 for further stability.

FIG. 17A illustrates an embodiment of a grip bar 670 with grip spikes 673 that are connected to the grip bar hinges 671, typically by welding. The strap retainers 672 are connected to the end if the grip bars 670.

FIG. 18 illustrates an embodiment of the telescoping support bar 580. The support bar generally includes a telescope tube 583 and a perforated bar 584 in telescopic arrangement with telescope tube 583. A curved brace bar 581 fits against the stationary object such as the tree 550 shown in FIG. 14 and is held on by the ratchet strap 570 hooked into tie down tabs 582. One end of the perforated bar 583 includes a support device 585 that is placed over a rung 111 on the extension rail 200. FIG. 18A illustrates an embodiment of a support device 585 that includes a threaded bolt 586 that is inserted through support bar hole 587 which is then tightened with a small wing nut 588. It is understood that other arrangements other that the threaded bolt 586 and wing nut 588 can be used to connect the support device 585 to the rung 111. Referring again to FIG. 18, the perforated bar 584 is slid into the telescope tube 583 to adjust the telescoping support bar 580 to a desired length. The perforated bar 584 is then locked into place by a suitable locking mechanism such as spring retainer 589 that can fit into one of a plurality of holes 590 on the perforated bar 584.

The next several figures illustrate details of certain accessories described above.

FIG. 19 illustrates an embodiment of a cushion 410 used in the cot and lounger configurations as shown in FIGS. 10 and 11, the cushion 410 including a hook and loop fastener 567. The hook and loop fastener 567 can be used to connect the cushion plate 400.

FIG. 20 illustrates a top view of an embodiment of a cushion plate 400. The cushion plate 400 generally includes an upper cushion plate 402 and a lower cushion plate 403, the plates 402, 403 being connected by a hinge 404. In one embodiment, the cushion plate 410 is typically formed of two metal sheets, one being the upper cushion plate 402 and the other being the lower cushion plate 403 that is hinged together near the middle by the cushion plate hinge 404. The cushion 410 (as described in detail in FIGS. 10 and 11) is attached to the cushion plate 400 by a fastener 567 such as a hook and loop fastener strap on the top end of the cushion 410 that is run through a fastener hole 401 at the top end of the upper cushion plate 402. Both cushion plates 402, 403 can include has tab notches 406 notched in it to fit over the retainer tabs 140 on the frame 110. The upper cushion plate 402 tab notches 406 are adapted to align with the tab notches 406 on the lower cushion plate 403 when folded. The cushion plate hinge 404 allows the cushion plate 400 to be folded in half to allow it to be stored flat on the frame 110. FIG. 21 illustrates a side view of an embodiment of a cushion tray 400. This side view illustrates the upper and lower cushion plates 402, 403 in an open configuration and attached by the hinge 404.

FIG. 22 illustrates a side view of a combination cart 100 in a tow configuration. The cart 100 is in a tow configuration with the handle 130 inserted into the handle mounting bracket 131 and the legs 145 on the front retainer tabs 140. The wheels 120 are attached to wheel brackets 124. The tray 153 is placed on the frame 110. Two extension rails 200 are stacked on the tray 153. The seat portion 560 is stacked on the extension rails 200. One ratchet strap 570 is tied around the seat portion 560 and the frame 110, with the extension rails 200 and the tray 153 between the seat portion 560 and the frame 110. The other ratchet strap 570 is tied around the extension rails 200 and the frame 110, with the tray 153 in between the extension rails 200 and the frame 110. The other components such as the legs 145, table legs 305, vehicle storage bar 320, the cushion 410, cushion plate 400, tent canopy 500, weather shield 510, tent poles 520, gun rest 566, telescoping support bar 580, arm rest 650 and any other components described above or use in conjunction with the cart 100 can be stored in the hollow interior of the tray 153. It is understood that the various components described above can be arranged and stored in other suitable manners on the frame 110.

Figure 23:
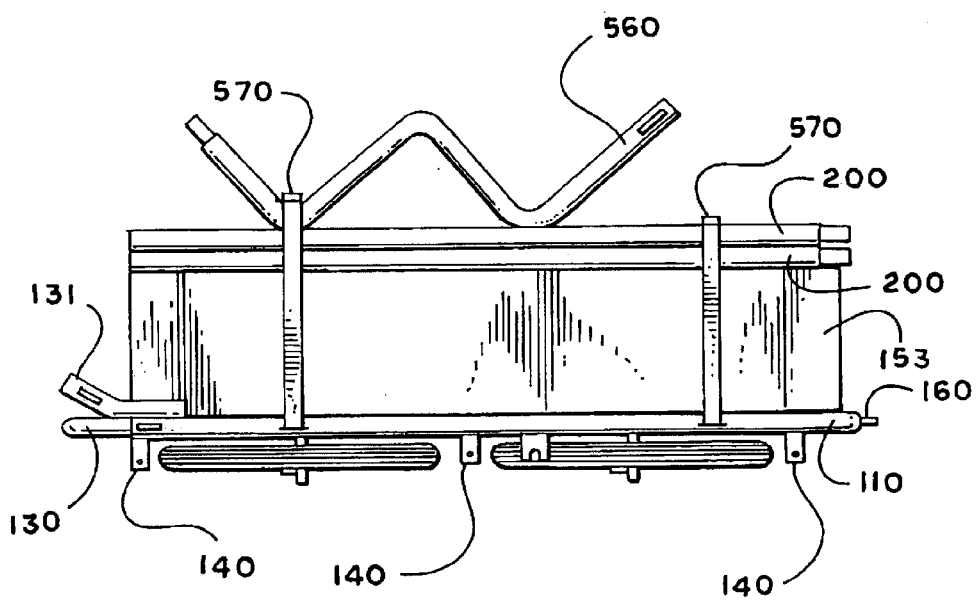
FIG. 23 illustrates a side view of a combination cart in an alternate stored configuration.

FIG. 23 illustrates a side view of a combination cart 100 in an alternate stored configuration. The wheels 120 are stored in the storage tabs 125 and the legs 145 are all removed from the retainer tabs 140. The handle 130 is removed from the handle mounting bracket 131 and stored within the hollow tubes of the frame 110. The remaining components are stored similarly as in FIG. 22. The tray 153 is placed on the frame 110. Two extension rails 200 are stacked on the tray 153. The seat portion 560 is stacked on the extension rails 200. One ratchet strap 570 is tied around the seat portion 560 and the frame 110, with the extension rails 200 and the tray 153 between the seat portion 560 and the frame 110. The other ratchet strap 570 is tied around the extension rails 200 and the frame 110, with the tray 153 in between the extension rails 200 and the frame 110. The other components such as the legs 145, table legs 305, vehicle storage bar 320, the cushion 410, cushion plate 400, tent canopy 500, weather shield 510, tent poles 520, gun rest 566, telescoping support bar 580, arm rest 650 and any other components described above or use in conjunction with the cart 100 can be stored in the hollow interior of the tray 153. It is understood that the various components described above can be arranged and stored in other suitable manners on the frame 110.

FIG. 24 illustrates an embodiment of a vehicle carry bar 320. As described above, the vehicle carry bar 320 is a type that can fit into a receiver hitch of a vehicle and this has a hole 321 through the bar 320 for the receiver's pin to fit. The carry bar 320 includes a fixed cart retaining bracket 322. The fixed cart retaining bracket 322 is typically made of steel that is adapted to fit snugly over the outside of the wheel shield 115. A pivoting cart retaining bracket 323 is located on the other end of the vehicle carry bar 320, and includes a curved portion 324. The curved portion 324 of the pivot cart retaining bracket 323 is typically formed to fit over the wheel shield 115 of the cart 100. Either side of the carry bar 320 includes two pivot cart retaining brackets 323 that are connected by a through-rod 325 that is fit through a hole in the carry bar 320. A connecting rod 326 fixes the pivot cart retaining brackets 323. A threaded bolt 327 is connected to the connecting rod 326 and protrudes through a hole in a tightening brace 328 that is connected downward from the carry bar 320. The threaded bolt 327 typically includes a wing nut 329 on it. The wing nut 329 can be screwed tightly against the tightening brace 328 to pivot the pivoting cart retaining bracket 323 causing the curved portions 324 to clamp against the outside of the wheel shield 115.

In the embodiments described above, the cart 100 and its various components are used to form a hunting stand configuration adapted to fit against a stationary object such as a tree 550. The cart 100 and its components can also be used to create a self-supporting hunting stand configuration.

FIG. 25 illustrates a side view of a combination cart 100 in self-supporting hunting stand configuration. The stand is configured to have three points of angle coming off the seat portion 560 to be able to support itself. It is understood that other points of angle can be included on the stand. The stand is configured similar as FIG. 14 except it also includes a tripod attachment 700 that slides into the end of the frame 600 of the seat portion 560 instead of the armrests 650. The seat portion 560 typically also includes the handle 130 connected to the gun rest retainers 564, and the gun rest 566. The cart 100 is also connected similar to FIG. 14. Extension rails 200 are connected to the cart 100 and the seat portion 560 similar to FIG. 14. The wheels 120 are connected to the cart 100. Upper tripod legs 710 are attached to the tripod attachment 700. Middle tripod legs 720 are attached to the upper tripod legs 710. Lower tripod legs 730 are attached to the middle tripod legs 720. Stand-to-leg support brackets 740 and leg to leg support brackets 750 (see FIG. 26) are also attached to the middle tripod legs 720. FIG. 26 illustrates a front view of a combination cart in a self-supporting hunting stand configuration.

FIG. 27 illustrates a side view of an embodiment of a tripod attachment 700. The tripod attachment 700 includes tripod attachment padded armrests 800 and tripod leg attachment 810 connected to the tripod attachment 700. The tripod leg attachment can connect to the upper tripod legs 710 at an angle so that two of the three points of angle can be achieved on the tripod attachment 700. The other point of angle is achieved from the seat portion 560. Back supports 720 (see FIG. 28) hold the tripod attachment 700 together as well as giving the occupant back support. Seat attachments 830 fit into the seat portion 560. FIG. 28 illustrates a front view of an embodiment of a tripod attachment 700.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A utility and recreation cart, comprising:
   a frame having two elongated and substantially parallel side tubes and a plurality of rungs substantially spaced along the frame and substantially perpendicular to the side tubes;
   handle mounting brackets connected to the side tubes at an end of the frame;
   storage tabs connected to the rungs;
   wheels connected to the frame, wherein the wheels are connected to the storage tabs;
   wheel brackets connected to the frame;
   a plurality of retainer tabs connected substantially perpendicular to the frame; and
   a handle connected to the frame.

2. The cart as claimed in claim 1 further comprising a plurality of poles connected to the retainer tabs.

3. The cart as claimed in claim 1 further comprising a tray connected to the frame, the tray having a plurality of tray tubes and table legs being optionally connected to the tray tubes.

4. The cart as claimed in claim 1 wherein the wheels are adapted to be removed from the storage tabs and be connected to the wheel brackets.

5. The cart as claimed in claim 1 further comprising an extension rail having rungs connected to the frame.

6. The cart as claimed in claim 5 further comprising:
a cushion plate in mechanical contact with the rungs of the frame and the extension rail; and
a cushion in mechanical contact with the cushion plate, thereby optionally forming at least one of a cot and a lounger.

7. The cart as claimed in claim 5 further comprising a seat portion connected to the extension rail, thereby forming a hunting stand.

8. The cart as claimed in claim 1 further comprising wheel shields connected to the frame and proximate the wheel brackets.

9. The cart as claimed in claim 1 wherein the handle is connected to the handle mounting bracket.

10. A utility and recreation cart, comprising:
a frame having two elongated and substantially parallel side tubes and a plurality of rungs substantially spaced along the frame and substantially perpendicular to the side tubes;
handle mounting brackets connected to the side tubes at an end of the frame;
wheels connected to the frame;
storage tabs connected to the rungs;
wheel brackets connected to the frame;
a plurality of retainer tabs connected substantially perpendicular to the frame;
a handle connected to the frame; and
a vehicle carry bar having a first end and a second end and connected to the frame, the vehicle carry bar having a fixed cart retaining bracket connected proximate the first end, and a pivot cart retaining bracket connected the second end.

11. A cart kit, comprising:
a frame having two elongated and substantially parallel side tubes and a plurality of rungs substantially spaced along the frame and substantially perpendicular to the side tubes;
handle mounting brackets connected to the side tubes at an end of the frame;
storage tabs connected to the rungs;
wheel brackets connected to the frame;
wheels connected to the frame, the wheels being adapted to be connected to the storage tabs and to the wheel brackets;
a plurality of retainer tabs connected substantially perpendicular to the frame;
a handle connected to the frame;
a tray adapted to be connected to the frame;
a vehicle carry bar having a first end and a second end and being adapted to be connected to the frame, the vehicle carry bar having a fixed cart retaining bracket connected proximate the first end, and a pivot cart retaining bracket connected the second end;
a first extension rail adapted to be connected to the frame; and
at least one additional extension rail adapted to be connected optionally to the frame and optionally to the first extension rail.

12. The kit as claimed in claim 11 further comprising a hunting attachment set including a seat portion.

13. The kit as claimed in claim 12 further comprising a tripod attachment adapted to be connected to the seat portion.

14. The kit as claimed in claim 13 further comprising ratchet straps adapted to connect the hunting attachment set to an object.

15. The kit as claimed in claim 14 further comprising a telescoping support bar adapted to secure the hunting attachment to the object.

16. The kit as claimed in claim 11 further comprising a cot and lounger attachment set having a cushion, canopy and net.

17. The kit as claimed in claim 11 wherein the tray further includes poles.

* * * * *